(12) United States Patent
Boulanger et al.

(10) Patent No.: US 10,353,141 B2
(45) Date of Patent: Jul. 16, 2019

(54) LIGHTING ARRANGEMENT

(71) Applicant: CP IP Holdings Limited, Central Hong Kong (CN)

(72) Inventors: Dave Boulanger, Hong Kong (CN); Maciej Nowakowski, West Vancouver (CA)

( * ) Notice: Subject to any disclaimer, the term of this patent is extended or adjusted under 35 U.S.C. 154(b) by 0 days.

(21) Appl. No.: 16/108,802

(22) Filed: Aug. 22, 2018

(65) Prior Publication Data

US 2019/0064429 A1    Feb. 28, 2019

Related U.S. Application Data

(60) Provisional application No. 62/549,002, filed on Aug. 23, 2017.

(51) Int. Cl.
*F21V 8/00* (2006.01)
*F21S 8/04* (2006.01)
*F21V 23/00* (2015.01)
*F21V 23/04* (2006.01)
*F21V 21/088* (2006.01)
(Continued)

(52) U.S. Cl.
CPC ............ *G02B 6/0088* (2013.01); *F21S 8/043* (2013.01); *F21V 21/088* (2013.01); *F21V 23/003* (2013.01); *F21V 23/04* (2013.01); *G02B 6/009* (2013.01); *G02B 6/0051* (2013.01); *F21Y 2103/10* (2016.08); *F21Y 2115/10* (2016.08)

(58) Field of Classification Search
CPC .... G02B 6/0088; G02B 6/0051; G02B 6/009; F21V 23/003; F21V 23/04; F21V 21/088; F21Y 2115/10; F21Y 2103/10; F21S 8/043
See application file for complete search history.

(56) References Cited

U.S. PATENT DOCUMENTS

| 5,101,540 | A | * | 4/1992 | Roof | ..................... | B60Q 1/302 |
| | | | | | | 24/293 |
| 5,526,553 | A | * | 6/1996 | Klein | ..................... | F16B 2/248 |
| | | | | | | 24/289 |

(Continued)

FOREIGN PATENT DOCUMENTS

| DE | 202006006613 U1 | 7/2006 |
| EP | 1139018 A2 | 10/2001 |

(Continued)

*Primary Examiner* — Kevin Quarterman
(74) *Attorney, Agent, or Firm* — Black, McCuskey, Souers & Arbaugh LPA (57) ABSTRACT

A lighting arrangement can include a light panel, a bracket, first and second retaining members, and first and second connecting members. The light panel can include a frame and light emitting units. The bracket can be mountable on a wall or a ceiling and have a back surface contained in a first plane and configured to contact the wall or ceiling. The light panel and the bracket can be selectively engageable with one another through rectilinear or rotational movement of the light panel along first and second paths of movement. First and second retaining members and first and second connecting members can be configured to selectively cooperate with one another to selectively interconnect the light panel and the bracket. A portion of one of the connecting members can accumulate energy during movement of the light panel.

20 Claims, 11 Drawing Sheets

(51) Int. Cl.
*F21Y 103/10* (2016.01)
*F21Y 115/10* (2016.01)

(56) References Cited

U.S. PATENT DOCUMENTS

| | | | |
|---|---|---|---|
| 6,530,681 B2* | 3/2003 | Sieczkowski | F21S 8/04 362/147 |
| 8,342,722 B1* | 1/2013 | Opdahl | F21S 8/04 362/145 |
| 8,376,777 B2 | 2/2013 | Smith | |
| 2006/0274522 A1* | 12/2006 | Williams | E04B 9/006 362/217.16 |
| 2017/0205053 A1 | 7/2017 | Green et al. | |
| 2018/0045880 A1 | 2/2018 | Boulanger et al. | |

FOREIGN PATENT DOCUMENTS

| | | |
|---|---|---|
| EP | 1218996 A1 | 7/2002 |
| WO | 2017003863 A1 | 5/2017 |

* cited by examiner

LIGHTING ARRANGEMENT

CROSS-REFERENCE TO RELATED APPLICATIONS

This application claims the benefit of U.S. Provisional Patent Application Ser. No. 62/549,002 for a LIGHTING ARRANGEMENT, filed on Aug. 23, 2017, which is hereby incorporated by reference in its entirety.

BACKGROUND

1. Field

The present disclosure relates to structures that emit light.

2. Description of Related Prior Art

U.S. Pat. No. 8,376,777 discloses a QUICK MOUNTING DEVICE WITH MODULES. The quick mounting device for appliances is alleged to be quickly and easily engaged and disengaged mechanically without the use of tools.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement can include a light panel, a bracket, first and second retaining members, and first and second connecting members. The light panel can include a frame and a plurality of light emitting units mounted on the frame. The bracket can be mountable on at least one of a wall and a ceiling. The bracket can include a back surface contained in a first plane and configured to contact and the at least one of the wall and the ceiling when the bracket is mounted. The light panel and the bracket can be selectively engageable with one another through one of rectilinear movement and rotational movement of the light panel relative to the bracket along a first path of movement in a first direction between a first position and a second position and further along a second path of movement in a second direction transverse to the first direction between the second position and a third position. The frame can include an uppermost surface positioned closest to the at least one of the wall and the ceiling when the bracket is mounted and when the light panel and the bracket are engaged with one another. The first and second retaining members can each be fixedly engaged with one of the light panel and the bracket. The first and second connecting members can each be fixedly engaged with the other of the light panel and the bracket. The first and second connecting members can be configured to selectively cooperate with the first and second retaining members to selectively interconnect the light panel and the bracket. At least a portion of at least one of the first and second connecting members can be configured to accumulate energy during movement of the light panel along the first path of movement in the first direction while the at least one of the first and second connecting members is engaged with one of the first and second retaining members. The at least a portion can be further configured to at least partially dissipate the accumulated energy during movement of the light panel to the third position.

BRIEF DESCRIPTION OF THE DRAWINGS

The detailed description set forth below references the following drawings.

DETAILED DESCRIPTION

Referring now to the Figures generally, a lighting arrangement 10 can include a bracket 12 and a light panel 14. The bracket 12 can be a unitary structure or can be an assembly of a plurality of structures that are permanently or releasably interconnected. The exemplary light panel 14 is rectangular in shape, but can be shaped differently in other embodiments of the present disclosure such as square, round, or elliptical.

The bracket 12 can be mountable on at least one of a wall and a ceiling. The exemplary bracket 12 includes a back surface 86 contained in a first plane and configured to contact the wall or ceiling when the bracket 12 is mounted. The outer surface of the wall or ceiling is thus substantially coplanar with the back surface 86. The first plane is referenced at 96 in the drawings. The bracket 12 can include a spine 16 and a pair of hook portions 118, 18. The spine 16 defines the exemplary back surface 86 and can be affixed to a wall, a ceiling or directly to a junction box, such as with fasteners. For example, a screw driver can be used to engage screws and mount the bracket 12 to a junction box or a drywall anchor or a stud. The hook portions 118, 18 are fixedly engaged with the spine 16, such as by being affixed to the spine 16 with fasteners or integrally formed with the spine 16. The exemplary hook portions 118, 18 are integrally-formed with the spine 16. The exemplary hook portions 118, 18 are exemplary first and second retaining members.

Figure 3:
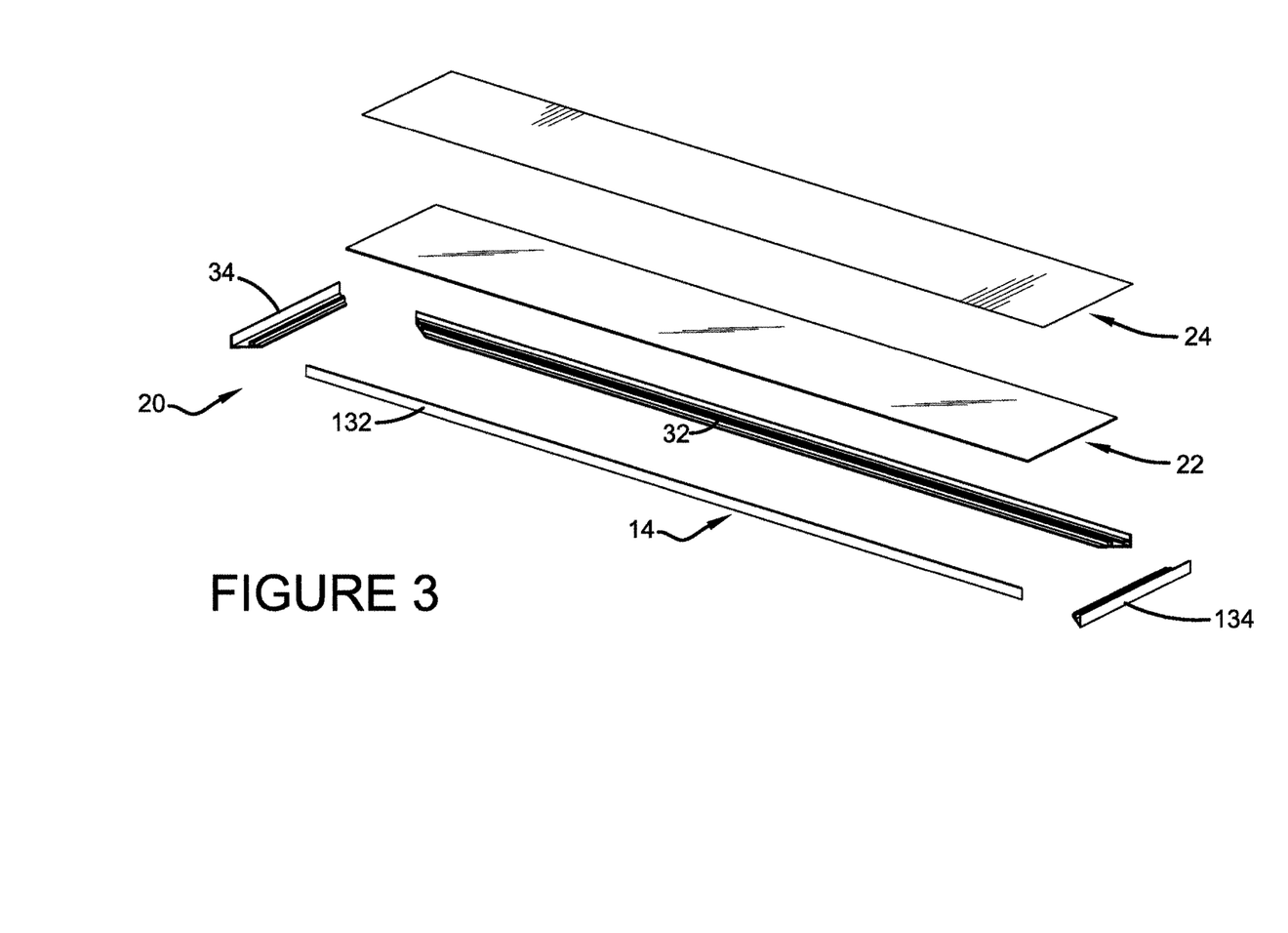
FIG. 3 is an exploded view of a portion of the exemplary lighting arrangement.
Figure 4:
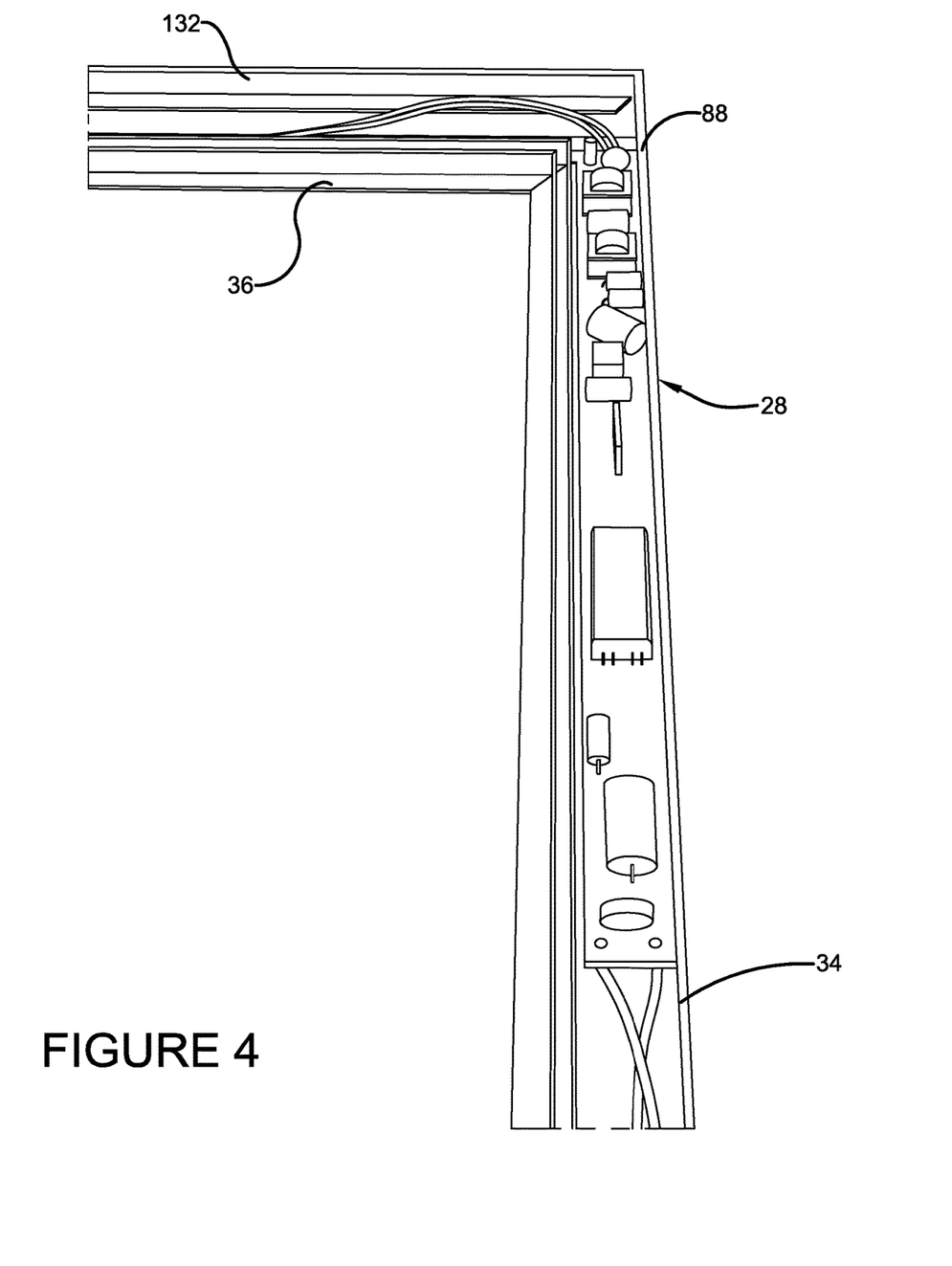
FIG. 4 is a perspective view of a portion of a frame of the exemplary lighting arrangement with a linear driver disposed in the frame.
Figure 5:
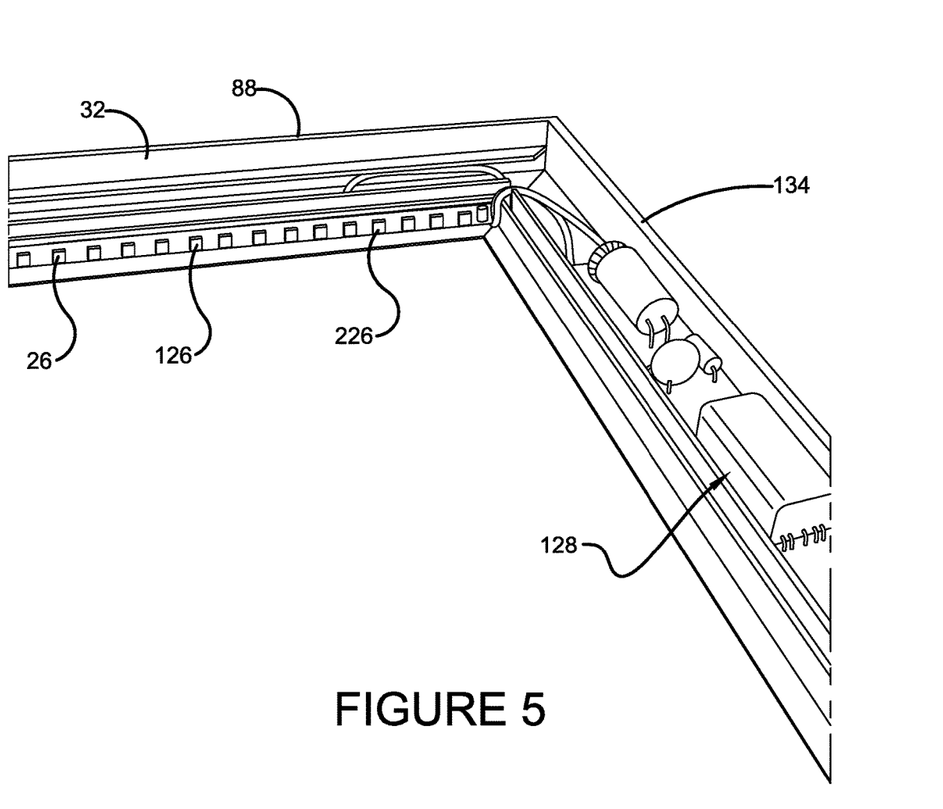
FIG. 5 is a perspective view of a portion of a frame of the exemplary lighting arrangement with the linear driver disposed in the frame and a portion of an array of light emitting diodes supported on the frame.
Figure 6:
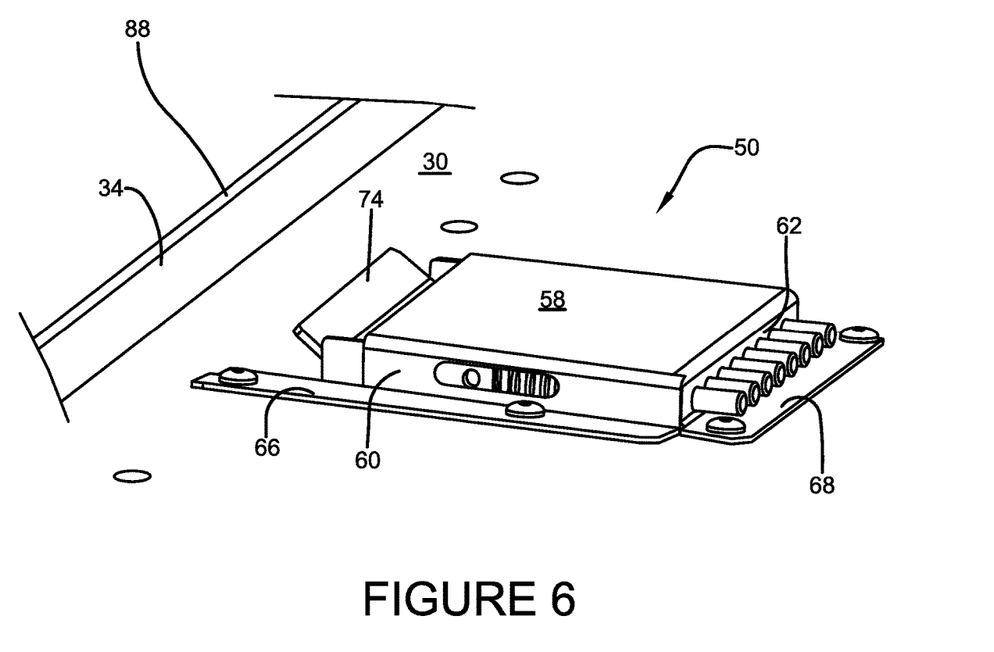
FIG. 6 is a magnified portion of FIG. 1 showing a connecting member of the exemplary lighting arrangement.

As best shown in FIGS. 3-5, the light panel 14 can include a frame 20, a diffuser 22, a light guide 24 with a backing of reflective paper, a plurality of light emitting units such as light emitting diodes ("LED" or "LEDs") such as LEDs 26, 126, 226 mounted on the frame 20, and one or more drivers 28, 128 for the LEDs. The light panel 14 can also include a back cover 30, referenced in other Figures. The exemplary lighting arrangement 10 is an edge-lit device based on the arrangement of the LEDs 26, 126, 226. The frame 20 can be a unitary structure or an assembly of a plurality of structures that are permanently or releasably interconnected. The exemplary frame 20 includes an uppermost surface 88 positioned closest to the wall or ceiling when the bracket 12 is mounted and when the light panel 14 and the bracket 12 are engaged with one another. The light panel 14 and the bracket 12 can be selectively engageable with one another, as will be described in greater detail below. "Selectively engageable" refers to being operable to be attached and detached from one another without damage.

The exemplary frame 20 includes a pair of longitudinal members 32, 132 and a pair of transverse members 34, 134. The members 32, 34, 132, 134 can be affixed together. Each of the members 32, 34, 132, 134 define a lip extending toward the center of the frame 20, such as the lip 36 of the member 132 shown in FIG. 4. The diffuser 22 and light guide 24 can rest on the lips defined by the members 32, 34, 132, 134.

The LEDs, such as LEDs 26, 126, 226, can be arranged in arrays along the members 32 and 132. Each LED can be directed at a side of the diffuser 22. The LEDs, such as LEDs 26, 126, 226, can be driven by the drivers 28, 128. The drivers 28, 128 can include circuitry to driver the LEDs and can be arranged on a relatively long and narrow circuit board. The drivers 28, 128 can be disposed in troughs defined by the members 34, 134. It is noted that the cross-section of the members 32, 132 is substantially similar to the cross-section of the members 34, 134. The back cover 30 can be affixed to the members 32, 34, 132, 134 of the frame 20 with fasteners. The fasteners can extend through apertures in the back cover 30.

The lighting arrangement 10 can also include first and second connecting members 50, 84. The exemplary connecting members 50, 84 are fixedly engaged with the light panel 14. It is noted that the positioning of the retaining and connecting members can be reversed in other embodiments of the present disclosure, with the retaining members fixedly engaged with the light panel and the connecting members fixedly engaged with the bracket 12. As set forth above, "fixedly engaged" can be defined as being attached to a structure through fasteners or snap-lock features or as being integrally-formed with the structure. "Integrally-formed" refers to two or more components that are formed together at the same time, such as in a mold or a press, rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined.

Figure 7:
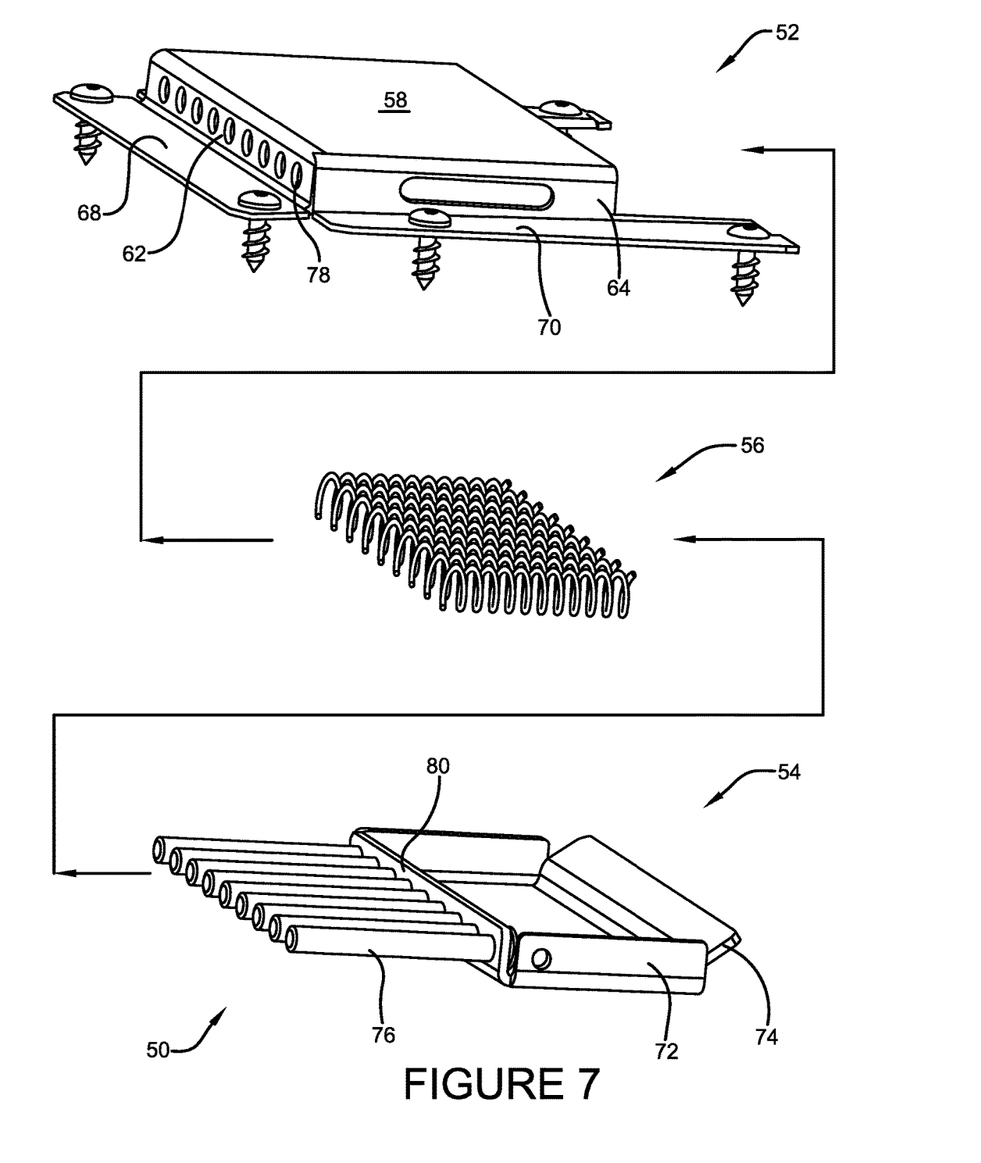
FIG. 7 is an exploded view of the connecting member shown in FIG. 6.
Figure 8:
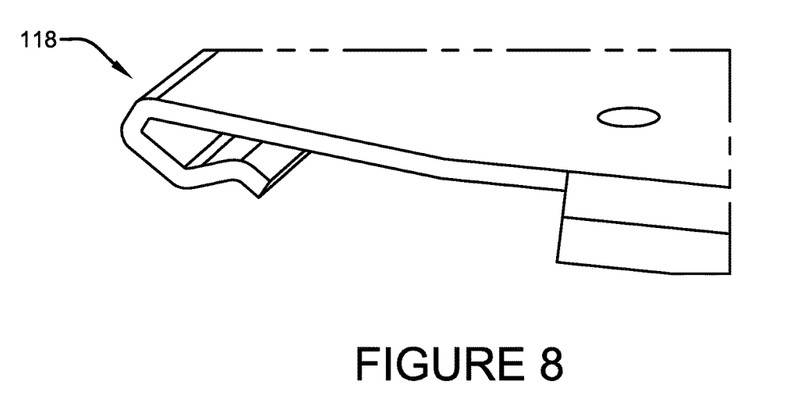
FIG. 8 is a magnified portion of FIG. 1 showing a first hook portion.
Figure 9:
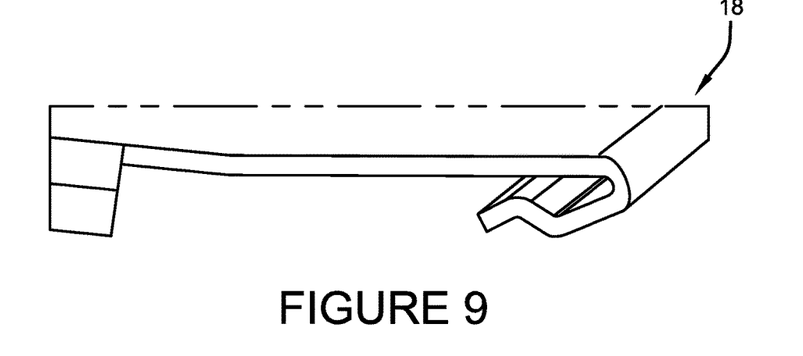
FIG. 9 is a magnified portion of FIG. 1 showing a second hook portion.
Figure 10:
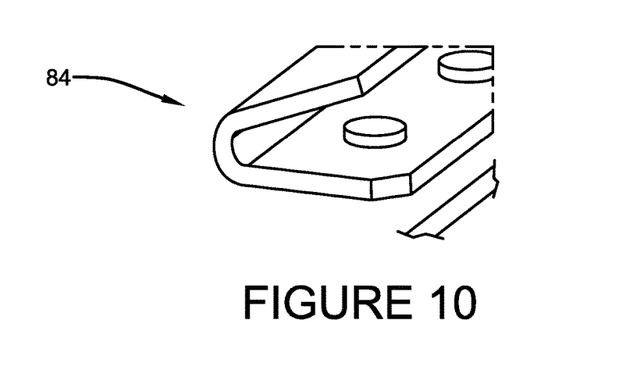
FIG. 10 is a magnified portion of FIG. 1 showing a tab.

In the exemplary embodiment of the present disclosure, the connecting member 50 is mounted on the back cover 30 which is fixedly engaged with the frame 20. As best shown in FIG. 7, the exemplary connecting member 50 includes a housing portion 52, a clip portion 54, and at least one spring 56. The exemplary connecting member 50 includes a plurality of springs 56.

The exemplary housing portion 52 includes walls 58, 60, 62, 64 forming a chamber for receiving the clip portion 54, and at least one spring 56. The exemplary housing portion 52 also includes flaps 66, 68, 70. Each of the flaps 66, 68, 70 are fixedly engaged with at least one of the walls 58, 60, 62, 64. Fasteners for connecting the housing portion 52 to the cover 30 can pass through the flaps 66, 68, 70.

The exemplary clip portion 54 includes a car 72, a tab 74, and at least one post 76. The exemplary clip portion 54 includes a plurality of posts 76. The tab 74 extends from one end of the car 72 and the posts 76 extend from the opposite end of the car 72. The clip portion 54 is inserted into the chamber defined by the housing portion 52, with the posts 76 leading. One of the springs 56 is mounted on one of the posts 76. The wall 62 includes one or more apertures, such as aperture 78, to receive each post. As the clip portion 54 is received in the housing portion 52, the post 76 passes through the aperture 78 in the wall 62, while the springs 56 are too large to pass through the aperture 78. As the clip portion 54 is further received in the housing portion 52 and the posts project further through the apertures in the wall 62, the springs 56 are further compressed between the wall 62 and a wall 80 of the car 72.

Figure 11:
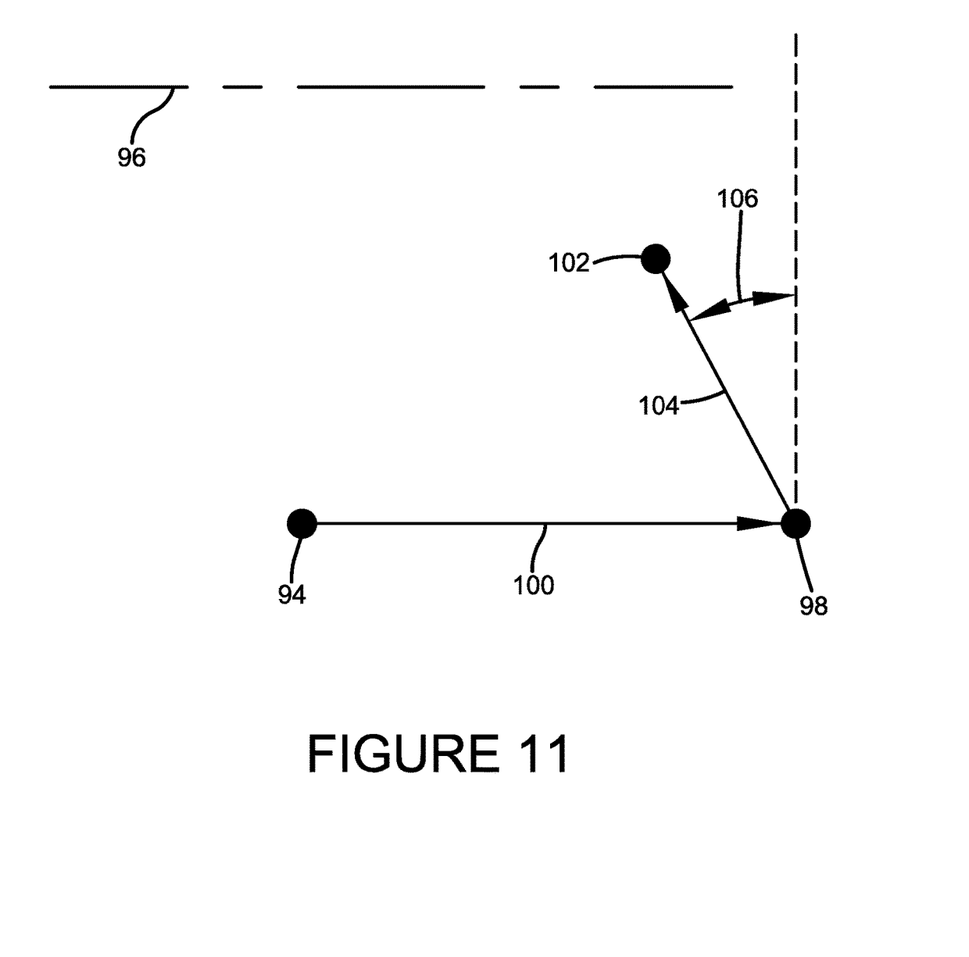
FIG. 11 is a schematic illustration of paths of movement of a light panel according to one or more embodiments of the present disclosure.

The light panel 14 and the bracket 12 are selectively engageable (attachable and detachable without breakage) with one another through one of rectilinear movement and rotational movement of the light panel 14 relative to the bracket 12. In the exemplary embodiment, the movement is rectilinear, but rotational movement can be applied in other embodiments of the present disclosure. In FIG. 11, a point 94 represents the light panel 14 at a first position. The point 94 can represent any point on the light panel 14, such as, but not limited to, the center of mass of the light panel 14. The line 96 represents the first plane, the plane of contact between the ceiling or wall and the back surface 86 of the bracket 12. The exemplary light panel 14 can move along a first path of movement in a first direction between the first position 94 and a second position 98. The first path of movement in the first direction is represented by the vector 100. The exemplary light panel 14 can further move along a second path of movement in a second direction transverse to the first direction between the second position 98 and a third position 102. The second path of movement in the second direction is represented by the vector 104. An angle between the vector 104 and an axis perpendicular to the wall or ceiling, referenced at 106, corresponds to a slope defined by a surface of the retaining members 118, 18, as will be made clear below. The exemplary vector 100 is substantially parallel to the plane 96 and the exemplary vector 104 is transverse to the plane 96.

Figure 1:
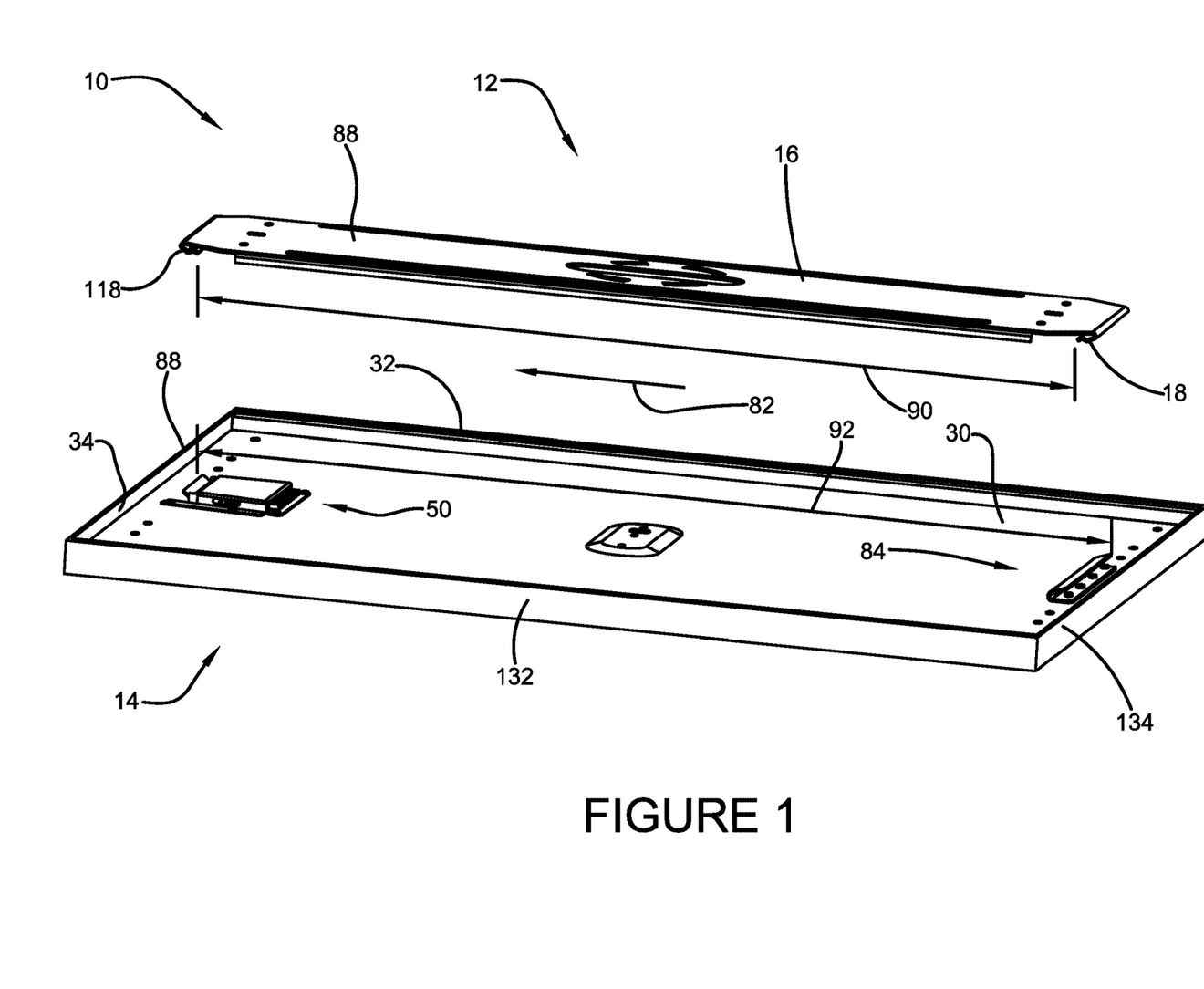
FIG. 1 is a partially exploded view a lighting arrangement according to an exemplary embodiment of the present disclosure wherein the point of perspective is at least partially the upper side of the lighting arrangement opposite to the side from which light will be emitted.
Figure 2:
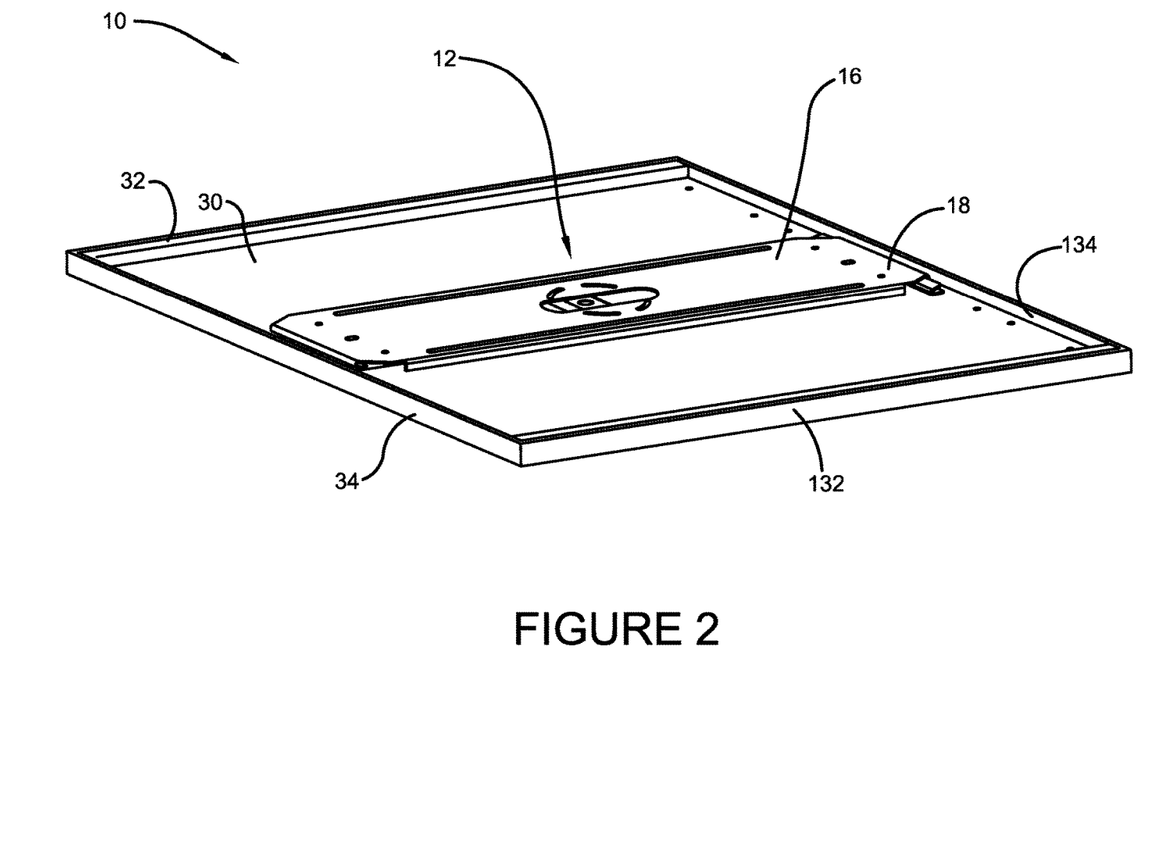
FIG. 2 is a perspective view the exemplary lighting arrangement wherein the point of perspective is generally the upper side.

As set forth above, the retaining and connecting members 118, 18, 50, 84 can be configured to interconnect the light panel 14 and the bracket 12. A first gap is defined between the first and second retaining members 118, 18. This gap is referenced at 90 in FIG. 1. In the exemplary embodiment, the extent or first distance of the gap 90 is fixed. A second gap is defined between the first and second connecting members 50, 84. This gap is referenced at 92 in FIG. 1. Prior to engagement between the light panel 14 and the bracket 12, the gap 92 is a second distance. After engagement between the light panel 14 and the bracket 12, the gap 92 is third distance that can be less than the second distance. In one or more embodiments of the present disclosure, the second distance and third distance can be the same. The exemplary first distance of the first gap is less that the second and third distances.

The exemplary spring 56 defines at least a portion of the first connecting member 50 that is configured to accumulate energy during at least a portion of the movement of the light panel 14 along the first path while the at least one of the first and second connecting members 50, 84 is engaged with one of the first and second retaining members 118, 18. The spring 56 can at least partially dissipate the accumulated energy during further movement of the light panel 14 along the second path. The extent that the spring 56 is compressed corresponds to the difference between the second distance and third distance of the gap 92.

Figure 12:
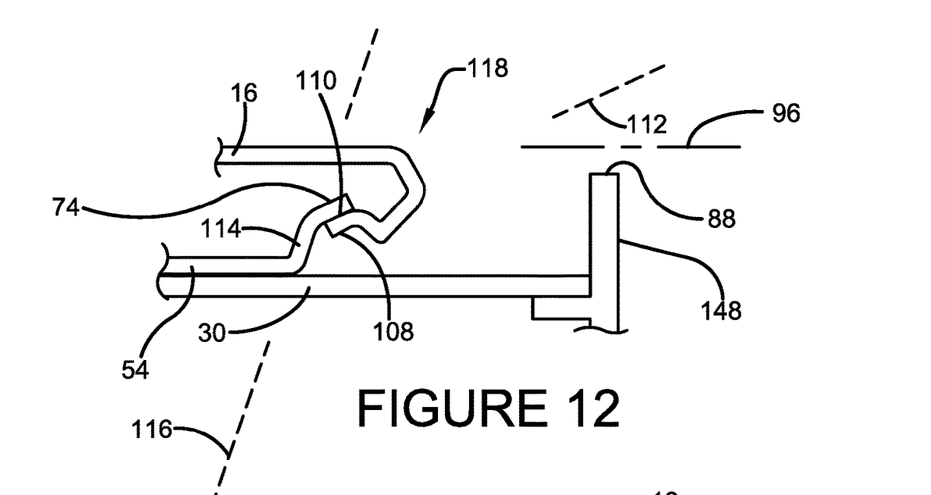
FIG. 12 is a side view of an exemplary first retaining member and an exemplary first connecting member engaged with one another.

During assembly of the lighting arrangement 10, the bracket 12 can be mounted to the desired surface, such as a ceiling or wall. The tab 74 can then be inserted in the first retaining member 118. This is shown in FIG. 12. FIG. 12 shows the tab 74 and the first retaining member 118 when the light panel 14 is in the first position 94. It is noted that, in the exemplary embodiment, the first and second retaining members 118, 18 are structurally identical and mirrored with respect to one another on opposite longitudinal sides of the bracket 12. Thus, alternatively, the tab 74 could be inserted in the second retaining member 18. It is also noted that the car 54 can slide across the back cover 30. The first retaining member 118 and the first connecting member 50 remain engaged together as the light panel 14 moves along the first path in the first direction (vector 100) to the second position 98.

The first retaining member 118 includes a tab 108 defining a supporting surface 110 extending in a second plane 112. A first acute angle is defined between the first plane 96 and the second plane 112. The first connecting member 50 includes a wall 114. The wall 114 is centered on an axis 116 that is transverse to the plane 112. The tab 74 projects away from the wall 114 and from the axis 116. The tab 74 rests on the supporting surface 110 when the light panel 14 is at the first position 94 and as the light panel 14 moves in the first direction. The tab 108 abuts the wall 114 and limits movement of the wall 114 in the first direction. This results in compression of the spring 56 as the light panel 14 moves in the first direction. During movement of the exemplary light panel 14 along the vector 100, the car 54 slides across the back cover 30 and the distance between the tab 74 and an outer edge 148 of the frame 20 increases.

The light panel 14 can be tilted slightly relative to the bracket 12 to allow the tab 74 and first retaining member 118 to become engaged without marring the ceiling or wall. However, after the tab 74 is rested on the tab 108, the light panel 14 can be arranged to be substantially parallel with the plane 96 so that the surface 88 is spaced from the plane 96 and thus spaced from the ceiling or wall when movement along the first path starts.

Referring now to FIGS. 13-17, the second retaining member 18 includes a tab 120 defining a supporting surface 122 extending in a plane 124. An acute angle is defined between the plane 96 and the exemplary plane 124. The second connecting member 84 includes a base 130 and a tab 136 projecting away from the base 130. The exemplary base 130 is centered on an axis 138 transverse to the plane 124. The exemplary axis 138 is parallel to the plane 96. The exemplary base 130 is fixed to the back cover 30, which has not been shown in FIGS. 13-17 to enhance the clarity of the other structures.

Figure 13:
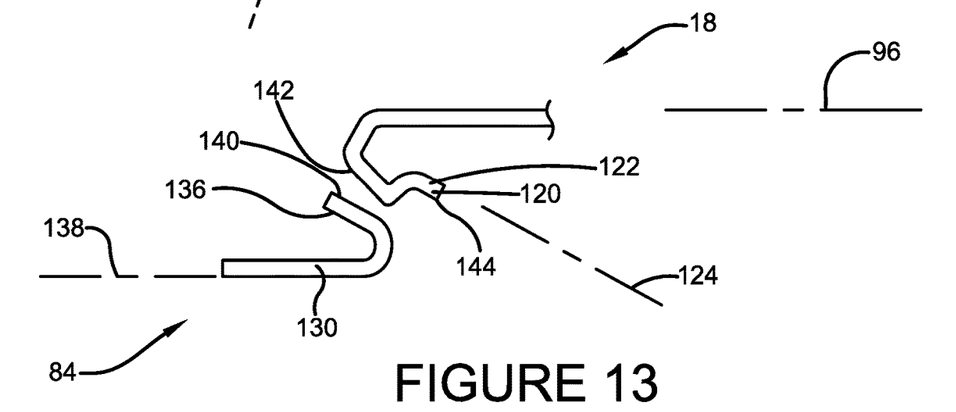
FIG. 13 is a side view of an exemplary second retaining member and an exemplary second connecting member at the start of movement of the light panel.

After the tab 74 is rested on the tab 108, the light panel 14 can be moved longitudinally and rectilinearly relative to the bracket 12 along the first path of movement. The direction of movement is referenced by arrow 82 in FIG. 1. During this movement, the springs 56 are compressed. The compression of the spring 56 is along axis of compression that extends substantially parallel to the plane 96. The exemplary tab 136 is spaced from the supporting surface 122 when the light panel 14 is at the first position. This is shown in FIG. 13. FIG. 13 shows the tab 136 and the second retaining member 18 when the light panel 14 is in the first position 94. The tab 136 may or may not be contacting the second retaining member 18 when the light panel 14 is at the first position 94 in various embodiments of the present disclosure.

The tab 136 moves with the light panel 14 and moves past the tab 120 as the light panel 14 moves from the first position to the second position. An upwardly-facing surface 140 of the tab 136 can slide across a downwardly-facing surface 142 of the second retaining member 18 during movement of the light panel 14 from the first position to the second position. The surface 142 faces in a direction opposite to a direction that the back surface 86 faces. The exemplary surface 142 is uneven (non-flat), having a variable distance from the plane 96, and include a first peak 144 defined by a distal end of the tab 120. A peak is a portion of the surface 142 that is a distance from the plane 96 greater than distances to the plane 96 of adjacent portions of the surface 142 on both sides. The exemplary second surface also includes a peak 146 (referenced in FIG. 14). When the light panel 14 moves from the first position to the second position, the exemplary tab 136 slides across both peaks 144, 146.

The interaction between the tab 136 and the peaks 144, 146 assist the installer during installation of the light panel 14 on the bracket 12. For example, after the tab 74 is rested on the tab 108 and the light panel 14 is pivoted to be parallel to the ceiling or wall, the tab 136 and peak 146 can contact one another and this contact can produce a tactile signal or "feel" that can be perceived by the installer. The shapes of the exemplary the tab 136 and peak 146 are somewhat spring-like and the installer can gently urge the light panel 14 upward before movement along the first path to detect the spring-like interaction and thereby confirm that the light panel 14 and bracket 12 are properly aligned before movement.

Figure 14:
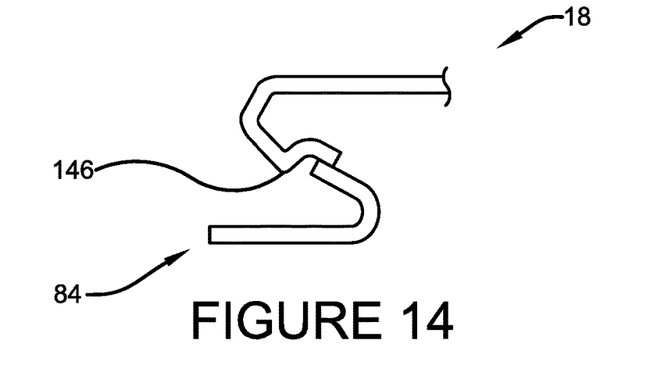
FIG. 14 is a side view of the exemplary second retaining member and the exemplary second connecting member during movement of the light panel along a first path of movement.

The installer can continue to gently urge the light panel 14 upward during movement along the first path. As shown in FIG. 14, the tab 136 can slide over the peak 146 and then rise into the gap between the peaks 144 and 146. This tactile sensation can be perceived by the installer and indicate that movement along the first path is almost complete.

Figure 15:
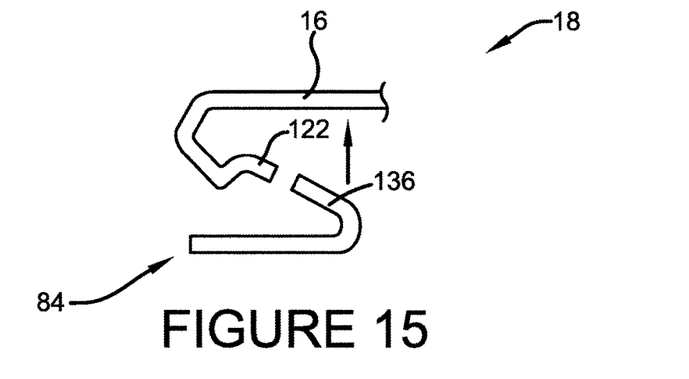
FIG. 15 is a side view of the exemplary second retaining member and the exemplary second connecting member when the light panel is in an exemplary second position.
Figure 16:
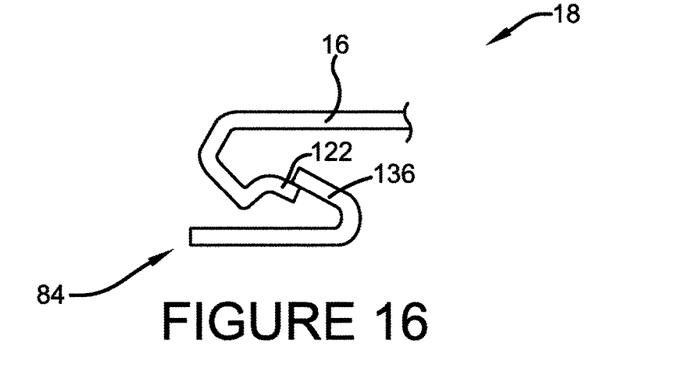
FIG. 16 is a side view of the exemplary second retaining member and the exemplary second connecting member during movement of the light panel along a second path movement.

FIG. 15 shows the tab 136 and the second retaining member 18 when the light panel 14 has reached the second position. The tab 136 has moved past the peak 144 and thus past the tab 122 and the light panel 14 can be raised slightly so that the tab 136 can overlap the tab 120 as the light panel 14 is moved to the third position 102 along the vector 104. FIG. 16 shows the tab 136 and the second retaining member 18 during movement of the light panel 14 to the third position from the second position.

Figure 17:
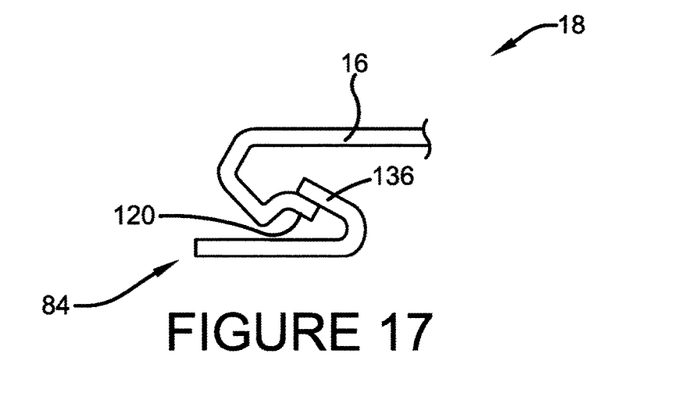
FIG. 17 is a side view of the exemplary second retaining member and the exemplary second connecting member when the light panel is in an exemplary third position.

The cooperation between the first and second retaining members 18, 118 and the first and second connecting members 50, 84 directs relative movement between the light panel 14 and the bracket 12 during movement of the light panel 14 from the second position to the third position. The cooperation is in the nature of a cam—cam follower, wherein the tab 136 of the second connecting member 84 slides up the ramp-like surface 122 of the second retaining member 18 as the light panel 14 moves from the second position to the third position. The slope of the surface 122 corresponds to the angle 106. Based on the orientation of the plane 124, the cooperation between the second retaining member 18 and the second connecting member 84 directs the light panel 14 at least partially toward the plane 96 during movement from the second position to the third position. The tab 136 rides up the tab 120 as the spring 56 releases energy accumulated during movement of the light panel 14 from the first position to the second position. The spring(s) 56 may be configured to have sufficient force relative to the weight of the light panel 14 to urge the light panel 14 along the second path without assistance from the installer. Alternatively, the spring(s) 56 may assist the installer in moving the light panel 14 along the second path. FIG. 17 shows the tab 136 and the tab 120 when the light panel 14 is in the third position 102, wherein the tab 136 overlaps and rests on the supporting surface 122.

The exemplary second connecting member 84 thus slides across a downwardly-facing surface 142 of the second retaining member 18 as the light panel 14 moves from the first position 94 to the second position 98 and across an upwardly-facing surface 122 of the second retaining member 18 as the light panel 14 moves from the second position 98 to the third position 102. It is noted that the uppermost surface 88 remains spaced from the plane 96 during movement of the light panel 14 between the first position 94 and the second position 98 and during movement of the light panel 14 between the second position 98 and the third position 102. The surface of the ceiling or wall is thus not marred. It is noted that in various embodiments of the present disclosure, all of the energy accumulated by the spring(s) 56 can be released when the light panel 14 reaches the third position or less than all of the accumulated energy can be released.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceeding the word is unimportant or unnecessary or "not critical" relative to anything else in this document. The word "can" is used herein in a positive and affirming sense and no other motive should be presumed. More than one "invention" may be disclosed in the present disclosure; an "invention" is defined strictly by the content of a patent claim and not by what is written in a detailed description of an embodiment of an invention.

What is claimed is:

1. A lighting arrangement comprising:
a light panel including a frame and a plurality of light emitting units mounted on said frame;
a bracket mountable on at least one of a wall and a ceiling, said bracket including a back surface contained in a first plane and configured to contact and the at least one of the wall and the ceiling when said bracket is mounted;
said light panel and said bracket selectively engageable with one another through one of rectilinear movement and rotational movement of said light panel relative to said bracket along a first path of movement in a first direction between a first position and a second position and further along a second path of movement in a second direction transverse to said first direction between said second position and a third position;
said frame including an uppermost surface positioned closest to the at least one of the wall and the ceiling when said bracket is mounted and when said light panel and said bracket are engaged with one another;
first and second retaining members each fixedly engaged with one of said light panel and said bracket; and
first and second connecting members each fixedly engaged with the other of said light panel and said bracket, said first and second connecting members configured to selectively cooperate with said first and second retaining members to selectively interconnect said light panel and said bracket, at least a portion of at least one of said first and second connecting members configured to accumulate energy during movement of said light panel along said first path of movement in said first direction while said at least one of said first and second connecting members is engaged with one of said first and second retaining members, and said at least a portion is further configured to at least partially dissipate the accumulated energy during movement of said light panel to said third position.

2. The lighting arrangement of claim 1 wherein a first gap having a first distance is defined between said first and second retaining members, a second gap having a second distance is defined between said first and second connecting members before said at least a portion has accumulated energy, said second gap changes to a third distance when said at least a portion has accumulated energy, said second distance is greater than said third distance, and said first distance is less than said second distance and said third distance.

3. The lighting arrangement of claim 2 wherein said at least a portion is compressed during movement of said light panel from said first position along said first path an amount equal to the difference between said second distance and said third distance.

4. The lighting arrangement of claim 1 wherein said first direction is further defined as substantially parallel to said back surface and said second direction is further defined as transverse said back surface.

5. The lighting arrangement of claim 1 wherein cooperation between said first and second retaining members and said first and second connecting members directs relative movement between said light panel and said bracket during movement from said second position to said third position.

6. The lighting arrangement of claim 5 wherein said first and second retaining members and said first and second connecting members cooperate to direct said light panel at least partially toward said first plane during movement from said second position to said third position.

7. The lighting arrangement of claim 6 wherein said uppermost surface remains spaced from said first plane during movement of said light panel between said first position and said second position and during movement of said light panel between said second position and said third position.

8. The lighting arrangement of claim 1 wherein said first connecting member further comprises:
a housing portion fixedly engaged with said other of said light panel and said bracket, said housing portion defining a chamber and an aperture communicating with said chamber;
a clip portion including a car and at least one post, said car received in said chamber and said at least one post extending from said car and through said aperture; and
said at least a portion wherein said at least a portion is further defined as of spring encircling said at least one post and positioned between said car and said housing portion.

9. The lighting arrangement of claim 1 wherein said first retaining member is further defined as fixedly engaged with said bracket, said first connecting member is further defined as fixedly engaged with said light panel, said at least a portion is further defined as of said first connecting member, and wherein said first retaining member and said first connecting member engage one another when said light panel is at said first position and remain engaged together as said light panel moves along said first path in said first direction.

10. The lighting arrangement of claim 9 wherein:
said first retaining member includes a first tab defining a first supporting surface extending in a second plane, a first acute angle defined between said first plane and said second plane; and
said first connecting member includes a wall and a second tab projecting away from said wall, said wall centered on an axis transverse to said second plane, said second tab resting on said first supporting surface when said light panel is at said first position and as said light panel moves in said first direction, said first tab abutting said wall and limiting movement of said wall in said first direction.

11. The lighting arrangement of claim 10 wherein:
said second retaining member includes a third tab defining a second supporting surface extending in a third plane, a second acute angle defined between said first plane and said third plane; and
said second connecting member includes a base and a fourth tab projecting away from said base, said base centered on an axis transverse to said third plane, said fourth tab spaced from said second supporting surface when said light panel is at said first position.

12. The lighting arrangement of claim 11 wherein said fourth tab moves with said light panel and moves past said third tab when said light panel moves from said first position to said second position.

13. The lighting arrangement of claim 12 wherein said fourth tab rests on said second supporting surface when said light panel is at said third position.

14. The lighting arrangement of claim 11 wherein said second retaining member defines a second surface facing in a direction opposite to a direction that said back surface faces, said second surface being uneven, having a variable distance from said first plane, and including a first peak defined by a distal end of said third tab.

15. The lighting arrangement of claim 14 wherein said fourth tab slides across said second surface when said light panel moves from said first position to said second position.

16. The lighting arrangement of claim 15 wherein said second surface is further defined as including a plurality of peaks, said plurality of peaks including said first peak, and said fourth tab slides across said plurality of peaks when said light panel moves from said first position to said second position.

17. The lighting arrangement of claim 11 wherein said second connecting member slides across a downwardly-facing surface of said second retaining member as said light panel moves from said first position to said second position and across an upwardly-facing surface of said second retaining member as said light panel moves from said second position to said third position.

18. The lighting arrangement of claim 11 wherein said fourth tab rides up said third tab when said at least a portion releases accumulated energy during movement from said second position to said third position.

19. The lighting arrangement of claim 1 wherein said at least a portion retains energy when said light panel is in third position.

20. The lighting arrangement of claim 1 wherein said at least a portion is compressed along axis of compression that extends substantially parallel to said first plane.

* * * * *